United States Patent [19]

Fishman

[11] 3,940,031

[45] Feb. 24, 1976

[54] REVERSE ACTING ROLLING DIAPHRAGM FOR EXPELLING LIQUIDS

[75] Inventor: Bernard Fishman, Fort Lee, N.J.

[73] Assignee: Thiokol Corporation, Newtown, Pa.

[22] Filed: Dec. 16, 1966

[21] Appl. No.: 602,420

[52] U.S. Cl. .............................................. 222/386.5
[51] Int. Cl.² .............................................. B67D 5/04
[58] Field of Search .......... 222/95, 386.5; 158/50.1; 239/323

[56] References Cited
UNITED STATES PATENTS

| | | | |
|---|---|---|---|
| 2,918,936 | 12/1959 | Dawson | 222/386.5 X |
| 3,070,265 | 12/1962 | Everett | 222/386.5 |
| 3,162,336 | 12/1964 | Erickson | 222/386.5 X |
| 3,319,420 | 5/1967 | Mercier | 222/386.5 X |

*Primary Examiner*—Verlin R. Pendegrass

[57] ABSTRACT

Disclosure relates to a diaphragm sleeve which is rolled inside out in a tank by a motive fluid supplied to one side thereof to positively displace fluid at the opposite side from the tank. The diaphragm has a wall of a thickness to resist transverse collpase of the sleeve by the motive fluid, but with a thin wall section adjacent a piston at its free end and an annular rib at the outer periphery of the piston to initially fold the diaphragm to promote rolling in opposite directions.

5 Claims, 3 Drawing Figures

INVENTOR.
BERNARD FISHMAN
BY
Curtis, Morris & Safford
ATTORNEYS

REVERSE ACTING ROLLING DIAPHRAGM FOR EXPELLING LIQUIDS

The present invention relates generally to positive displacement, liquid expulsion systems and more particularly to an improved "rolling diaphragm" construction which compensates for any expansion of the fluid after expulsion commences.

Such rolling diaphragms are in the form of a cylindrical sleeve hermetically sealed at an end to the liquid containing tank and at the other end to a piston which separates the liquid to be expelled and a pressurizing gas. The piston is propelled along the tank by the pressurized gas to expel stored liquid through an outlet port at the opposite end of the tank. Rolling diaphragms of this general type are particularly useful in liquid expulsion systems of packaged liquid propellant type rocket engines, but their usefulness are limited by the tendency of the diaphragm to buckle inwardly from the gas pressure acting radially thereon. Such radial buckling increases with the length of the sleeve. Therefore, in order to avoid radial buckling, a rolling diaphragm must be designed with a wall thickness and length which will insure a rolling action without buckling, or a thin diaphragm may be bonded to the tank wall by an adhesive having a greater resistance to peeling than the resistance of the diaphragm to rolling.

Another problem arising with such rolling diaphragms is that the movement of the piston is not always continuous. Power plant operation may be divided into separate stages with a non-firing period between the stages during which time the rocket engine glides. During such a non-firing period, propellant expansion may occur due to aerodynamic heating or to heat transfer thereto from the hot pressuzing gas. The result of such liquid expansion can produce an excessive force acting on a partially rolled diaphragm which, unless relieved, may produce a buckling or distortion of the partially rolled portion of the diaphragm which will prevent proper operation during the next firing stage.

Accordingly, the main object of the present invention is to provide an improved diaphragm construction which will promote a rolling action of the diaphragm before lateral buckling occurs.

Another object of the invention is to provide an improved construction in a rolling diaphragm which will cause it to roll with the piston in one direction during a first liquid expulsion stage and then roll back within itself in a reverse direction on expansion of the liquid or propellant during a non-firing or sustain period.

Still another object of the present invenion is to provide an improved diaphragm construction in which the piston and a section of the diaphragm adjacent the piston are so formed as to facilitate and control the roll-back of the diaphram in a reverse direction upon expansion of the fluid in the tank.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

IN THE DRAWING

Figure 1:
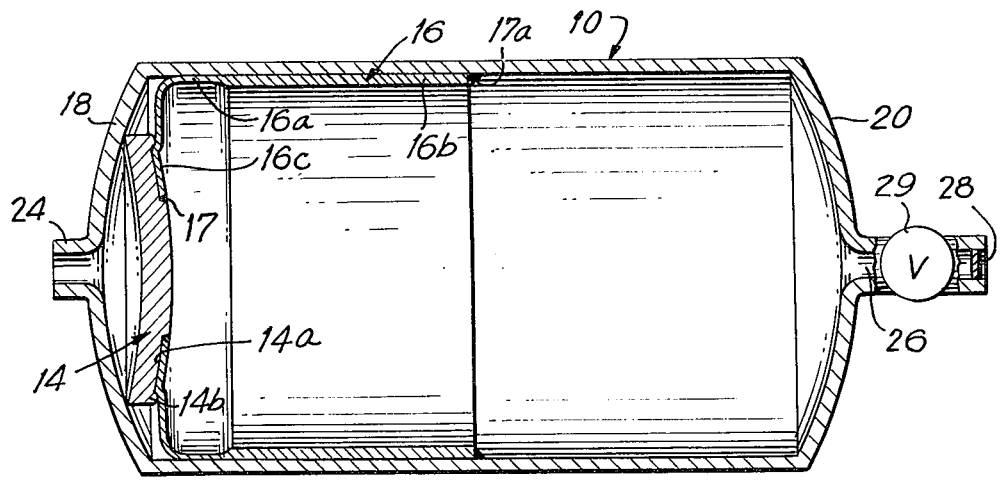
FIG. 1 is a longitudinal sectional view of a tank and expulsion system incorporating the novel features of the present invention and showing the reduced thickness of the wall of the end section of the rolling diaphragm adjacent the piston.

Referring now to the drawing, the present invention is shown applied to a liquid storage tank 10. While the tank may have other uses, it is particularly adapted to store a liquid propellant in a rocket engine. Tank 10 has a liquid expulsion apparatus therein comprising piston 14 and rolling diaphragm 16. The rolling diaphragm 16 is in the form of a cylindrical sleeve of a flexible material and hermetically sealed at one end 17 to the piston and at its opposite end 17a to the wall of the tank 10. Piston 14 and diaphragm 16 may be constructed of a lightweight material such as aluminum, and may be made as separate parts and joined to each other, or may be made as an integral unit.

Figure 2:
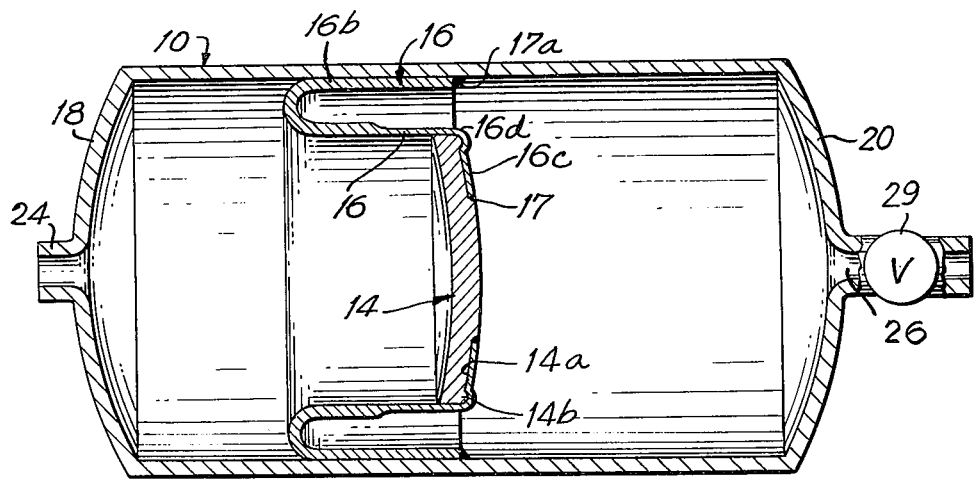
FIG. 2 is a view similar to FIG. 1 and showing the position of the diaphragm and piston at the end of the first firing stage.

The tank 10 is provided with end walls 18 and 20 and the former has an inlet 24 for the admission of a pressurizing medium, such as gas, into the tank between the piston 14 and end wall 18. Tank 10 is filled with the liquid at one side of the piston 14 and the liquid is expelled through a discharge port 26 in the end wall 20. A burst disc 28 is provided in the discharge port 26 to normally seal the latter and a shut off device 29 in the discharge port controls the flow of liquid from the tank 10 between stages. As thus far described, the tank and expelling apparatus is of conventional construction and when a motive fluid under pressure is admitted through the inlet port 24, it acts against the piston 14 and moves it away from the end wall 18. When the pressurizing fluid is initially supplied its pressure is transmitted through the piston 14 and builds up a pressure in the stored liquid until the disc 28 bursts. The liquid in the tank 10 is then discharged through the outlet port 26 as the piston 14 moves from the position illustrated in FIG. 1 to that illustrated in FIG. 2. During such movement of piston 14 towards the end wall 20, the thin flexible cylindrical diaphragm 16 rolls back on itself as shown in FIG. 2.

In accordance with the present invention, the rolling diaphragm and piston are so constructed as to limit the build up of differential pressure to that required for initating or maintaining movement of the piston. More specifically, the rolling diaphragm and piston are so constructed as to facilitate and guide the rolling of the diaphragm back on itself in either direction adjacent the piston before the remainder of the diaphragm is deformed.

To this end the rolling diaphragm 16 has an annular section 16a adjacent the piston 14 of a thinner gauge than the remainder of the diaphragm sleeve 16b. The portion 16a of the diaphragm sleeve of thinner guage should extend for at least the distance through which the piston 14 will be expected to move between firing stages due to an expansion of the liquid remaining in the tank 10. However, the section 16a can be extended for a greater distance without adversely effecting its operation. In the illustrated embodiment, approximately one-third of the diaphragm sleeve constitutes the end section 16a of reduced thickness, but it will be understood that it can be made shorter or longer. This section 16a of the diaphragm sleeve insures a rolling of the wall by the piston 14 before the remaining section 16b of the sleeve is rolled back on itself. In this way the section 16a may be made thin enough to insure initial rolling of the diaphragm, but for a distance only where it will resist lateral buckling. The more remote section 16b of the sleeve is thicker to resist lateral buckling at the location where the force tending to produce buckling are greater. Actually the sections 16a and 16b may be made of progressively increasing thickness so as to provide a wall of tapered thickness from one end to the other to compensate for the increased tendency of the sleeve wall to buckle as its length increases.

The end 16c of the reduced section 16a attached to the rolling diaphragm 16 is folded radially inward and seated in an annular recess 14a formed in the forward face of the piston 14. The end portion 16c is fixedly attached to the piston 14 as by welding, brazing or soldering it thereto.

Figure 3:
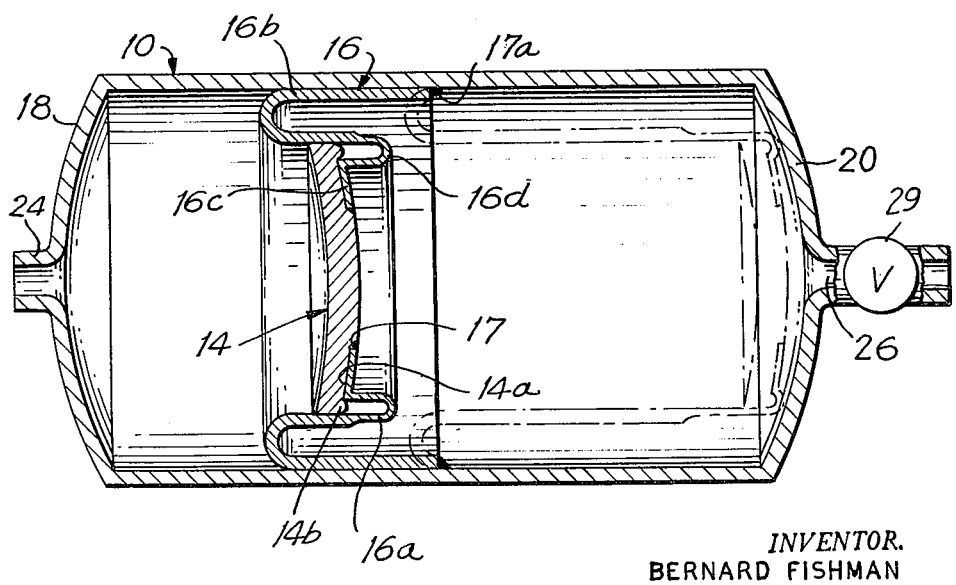
FIG. 3 is a view similar to FIGS. 1 and 2 showing the diaphragm rolled in a reversed direction between the first and second firing stages to equalize the pressure at opposite sides of the diaphragm.

In addition, the piston 14 has an annular rib 14b at its outer periphery which projects forwardly from the seat 14a and is of rounded contour to initially produce an annular indentation or fold 16d in the diaphragm section 16a to facilitate and promote rolling of the diaphragm. Furthermore, after the diaphragm 16 has been rolled back on itself from the position shown in FIG. 1 to that shown in FIG. 2, the annular indentation or fold 16d in the diaphragm controls and guides the rolling of reduced section 16a in a reverse direction as shown in FIG. 3. One form of the invention having been described in detail, the mode of operation is next explained.

Let it be assumed that the rocket engine on which the tank 10 is mounted is to be fired in two successive stages. To this end, a pressurizing gas is supplied through the inlet 24 in the end wall 18 of the tank 10 between the piston 14 and end wall. The pressure supplied by the gas acts through the piston 14 to produce a corresponding pressure build-up in the liquid being stored in the tank 10 until it bursts the sealing disc 28. The diaphragm 16 then rolls back on itself and liquid stored in the tank 10 flows through the outlet port 26. During the initial movement of the piston 14 the annular rib 14b at the outer periphery of the piston 14 produces the circular indentation or fold 16d in the section 16a of the diaphragm 16 of reduced thickness to promote and control the rolling action. The gas forces the piston 14 to the right from the position illustrated in FIG. 1 to that illustrated in FIG. 2 where the first stage is completed by actuating the shut-off device 29 to stop flow from the tank 10. At this time, the pressure of the fluid and liquid on opposite sides of the piston 14 and diaphragm 16 tend to be equalized. However, as heat is transmitted from the motive fluid through the piston 14 and diaphragm 16 it heats the liquid to a higher temperature, and the liquid may be further heated by the friction of the rocket engine as it moves through the atmosphere. When this occurs a greater pressure is exerted by the liquid than by the pressurizing fluid which may either remain constant or tend to cool off and reduce in pressure. If this difference in pressure is not compensated it may produce a lateral buckling or distortion of the diaphragm 16 which will interfere with its proper operation during its next firing stage. However, when the pressure existing in the liquid becomes greater than the pressure of the motive fluid the piston 14 will move in the opposite direction and roll the diaphragm 16 in a reverse direction as illustrated in FIG. 3. Furthermore, such reverse rolling of the diaphragm 16 occurs in the section 16a of reduced thickness rather than in the thicker section 16b, and the initial fold 16d of the diaphragm section promotes, facilitates and controls the rolling of the diaphragm in a reverse direction before it buckles.

After the glide and sustained period of the rocket engine another firing stage may be initiated which will first cause a movement of the piston 14 from the position shown in FIG. 3 back to the position illustrated in FIG. 2 at which time the peripheral rib 14b of the piston will seat in the reverse fold 16d of the reduced section 16a of the diaphragm 16. Continued application of the pressurizing fluid on the piston 14 will then cause the remaining liquid in the tank 10 to be positively displaced and discharge through the outlet port 26.

It will now be observed that the present invention provides an improved rolling diaphragm which will always insure rolling of the diaphragm before it buckles. It will further be observed the present invention provides an improved construction in a rolling diaphragm which will permit it to roll back on itself in a reverse as well as a forward direction upon expansion of the liquid during a non-firing or sustain period. It will still further be observed that the present invention provides an improved diaphragm construction which will facilitate and control a reverse roll-back of the diaphragm adjacent the piston upon expansion of the fluid in the tank.

While a single embodiment of the invention is herein shown and described, it will be understood that changes may be made in the construction and arrangement of elements without departing from the spirit or scope of the invention. Therefore, without limitation with this respect the invention is defined by the following claims.

I claim:

1. A liquid storage tank of the type having a rolling diaphragm therein comprising a sleeve of flexible material attached to the tank at one end and to the periphery of a rigid piston at the opposite end and adapted to be operated by a pressurizing medium acting on the piston in successive stages to roll the diaphragm back on itself and expel liquid from the tank, the combination with said tank and rolling diaphragm of a construction in which the diaphragm sleeve has a thick wall section to resist buckling or distortion of the diaphragm initially and between stages, a thin wall section adjacent the rigid piston to permit limited rolling of the diaphragm by the expansion of the liquid acting on the piston due to absorbed heat, and means for producing a first fold in the thin wall section of the diaphragm to initiate rolling of the diaphragm in one direction during the first stage of applied pressure and a reverse fold in the thin walled section of the diaphragm sleeve adjacent the piston to control the location of the limited rolling of the diaphragm sleeve by the expansion of liquid after the first stage of applied pressure.

2. Apparatus for positively expelling stored liquid from a liquid storage tank comprising a rolling diaphragm having a sleeve attached at one end to the tank and attached to the periphery of a rigid piston at its opposite end, means for supplying a motive fluid between the piston and tank to roll the diaphragm back on itself, an outlet port through which the liquid is expelled by the rolling diaphragm, said sleeve of the rolling diaphragm having a section adjacent the piston of greater flexibility than the remainder of the sleeve to permit initial rolling of the diaphragm adjacent the piston at a lower differential pressure than the section of the sleeve more remote from the piston, and means operated by the movement of the piston in one direction for forming a reverse fold in the diaphragm sleeve adjacent the piston to control limited rolling of the sleeve in a reverse direction.

3. Apparatus for positively expelling stored liquid from a tank in accordance with claim 2 in which the piston is provided with a rib at its outer periphery for inserting the reverse fold in the section of the sleeve adjacent piston to facilitate rolling of the diaphragm in either direction.

4. Apparatus for positively expelling stored liquid from a tank in accordance with claim 2 in which the diaphragm is of progressively increasing thickness from the end attached to the piston to the end attached to the tank.

5. Apparatus for positively expelling stored liquid in a tank in accordance with claim 2 in which the piston has an annular recess on one side adjacent its periphery, the flexible end of the diaphragm being seated in said annular recess and attached thereto, and an annular rib at the outer periphery of the recess for producing a reverse fold in the flexible section of the diaphragm when the piston is actuated by the motive fluid to facilitate initial rolling of the diaphragm, and said reverse fold controlling and guiding a reverse rolling of the diaphragm between stages to relieve excessive pressure in the liquid between stages.

* * * * *